United States Patent
Park et al.

(10) Patent No.: US 7,379,134 B2
(45) Date of Patent: May 27, 2008

(54) LIQUID CRYSTAL DISPLAY HAVING AN INSULATING LAYER ON A PORTION OF THE COMMON ELECTRODE

(75) Inventors: Won-Sang Park, Yongin-si (KR);
 Kee-Han Uh, Yongin-si (KR);
 Yong-Kyu Jang, Suwon-si (KR);
 Sang-Woo Park, Seoul (KR);
 Sang-Woo Kim, Suwon-si (KR);
 Sung-Eun Cha, Geoje-si (KR);
 Jae-Young Lee, Seoul (KR); Jae-Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 63 days.

(21) Appl. No.: 10/833,553

(22) Filed: Apr. 28, 2004

(65) Prior Publication Data

US 2004/0218123 A1 Nov. 4, 2004

(30) Foreign Application Priority Data

Apr. 30, 2003 (KR) ...................... 10-2003-0027399
Jun. 9, 2003 (KR) ...................... 10-2003-0036816

(51) Int. Cl.
 *G02F 1/1343* (2006.01)
 *G02F 1/1333* (2006.01)

(52) U.S. Cl. ...................... 349/114; 349/106; 349/138

(58) Field of Classification Search ................ 349/114, 349/138
See application file for complete search history.

(56) References Cited

U.S. PATENT DOCUMENTS

| | | | |
|---|---|---|---|
| 6,147,727 A * | 11/2000 | Shigeno | 349/99 |
| 6,724,452 B1* | 4/2004 | Takeda et al. | 349/139 |
| 6,850,298 B2* | 2/2005 | Fujimori et al. | 349/114 |
| 2002/0149728 A1* | 10/2002 | Ogishima et al. | 349/129 |
| 2003/0118922 A1* | 6/2003 | Hayashi et al. | 430/7 |
| 2004/0008312 A1* | 1/2004 | Yun et al. | 349/141 |
| 2005/0122450 A1* | 6/2005 | Kang | 349/114 |

* cited by examiner

*Primary Examiner*—Andrew Schechter
(74) *Attorney, Agent, or Firm*—F. Chau & Associates, LLC

(57) ABSTRACT

In a liquid crystal display apparatus, a lower substrate has a transmissive electrode formed in a transmissive area of a first substrate and a reflective electrode formed in a reflective area of the first substrate. An upper substrate has a second substrate, a first insulating layer formed on the second substrate corresponding to the transmissive area, a common electrode formed on the first insulating layer and the second substrate corresponding to the reflective area, and a second insulating layer formed on the common electrode corresponding to the reflective area. Accordingly, the liquid crystal display apparatus may have a uniform cell gap, thereby improving a reflectance and a transmittance thereof.

12 Claims, 15 Drawing Sheets

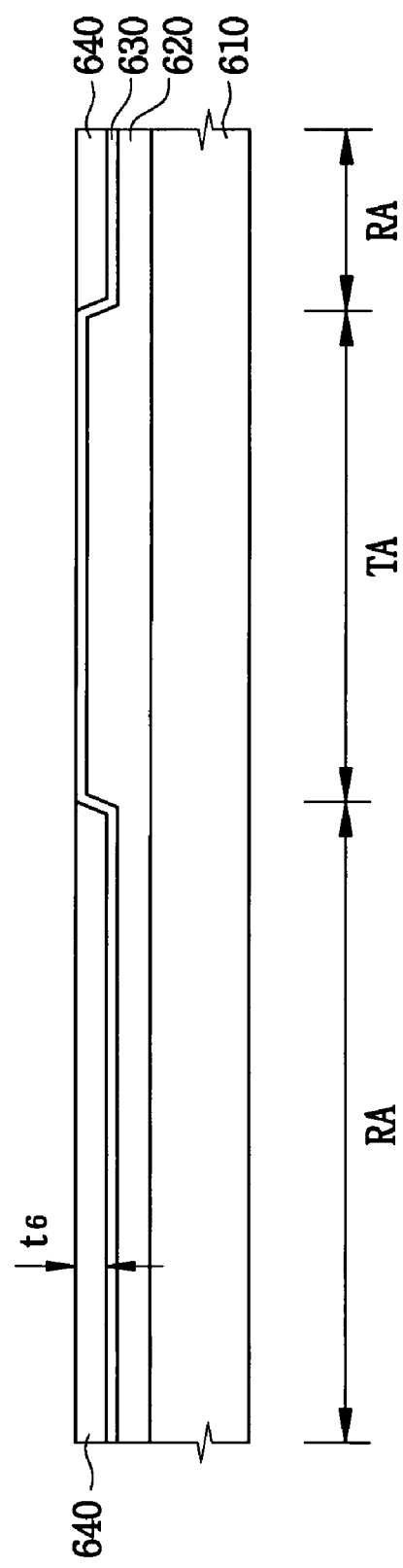

US 7,379,134 B2

LIQUID CRYSTAL DISPLAY HAVING AN INSULATING LAYER ON A PORTION OF THE COMMON ELECTRODE

CROSS-REFERENCE TO RELATED APPLICATIONS

This application relies for priorities upon Korean Patent Application No. 2003-27399 filed on Apr. 30, 2003, and Korean Patent Application No. 2003-36816 filed on Jun. 9, 2003, the contents of which are herein incorporated by reference in their entireties.

BACKGROUND OF THE INVENTION

1. Field of the Invention

The present invention relates to an upper substrate, a liquid crystal display apparatus having the same and a method of manufacturing the same. More particularly, the present invention relates to an upper substrate capable of improving display quality, a liquid crystal display apparatus having the same and a method of manufacturing the same.

2. Description of the Related Art

A transflective type liquid crystal display apparatus displays an image in a reflective mode using an external light when the external light is sufficient to display the image, and displays an image in a transmissive mode using an internal light when the external light is insufficient to display the image.

A transflective type liquid crystal display apparatus includes a liquid crystal display panel. The liquid crystal display panel includes a lower substrate, an upper substrate opposite to the lower substrate and a liquid crystal layer disposed between the lower substrate and the upper substrate.

The lower substrate includes a thin film transistor (TFT), a transmissive electrode electrically connected to a drain electrode of the TFT and a reflective electrode formed on the transmissive electrode and also connected to the drain electrode of the TFT. An area that the reflective electrode is formed on the transmissive electrode is defined as a reflective area to reflect the external light. An area that only the transmissive electrode is formed is defined as a transmissive area to transmit the internal light.

An organic insulating layer is disposed between the TFT and the transmissive electrode. The organic insulating layer has a contact hole through which the drain electrode of the TFT is exposed. Thus, the transmissive electrode may be electrically connected to the drain electrode through the contact hole.

In order to improve light efficiency and display quality in the reflective mode and the transmissive mode, generally, a transflective type liquid crystal display apparatus has a first cell gap at the reflective area and a second cell gap different from the first cell gap at the transmissive area. That is, the first cell gap at the reflective area is smaller than the second cell gap at the transmissive area.

Thus, the organic insulating layer has a thickness at a position corresponding to the reflective area, which is thinner than that at a position corresponding to the transmissive area, thereby completing a transflective type liquid crystal display apparatus having a dual cell gap. However, in order to manufacture the transflective type liquid crystal display apparatus having the dual cell gap, a complex manufacturing process is needed to adjust a thickness of the organic insulating layer.

As a result, a transflective type liquid crystal display apparatus having a uniform cell gap liquid crystal display and enhanced light efficiency in the reflective mode and in the transmissive mode is required.

BRIEF SUMMARY OF THE INVENTION

The present invention provides an upper substrate capable of improving display quality.

The present invention further provides a liquid crystal display liquid crystal display apparatus having the above upper substrate.

The present invention still further provides a method suitable for manufacturing the above liquid crystal display apparatus.

In one aspect of the present invention, an upper substrate includes a substrate having a first area and a second area adjacent to the first area, a first insulating layer disposed on the first area of the substrate, a transmissive electrode disposed on the first insulating layer and the second area of the substrate, and a second insulating layer disposed on the transmissive electrode corresponding to the second area.

In another aspect of the present invention, a liquid crystal display apparatus includes a lower substrate, an upper substrate, and a liquid crystal layer disposed between the lower substrate and the upper substrate.

The lower substrate includes a transmissive electrode formed in a transmissive area of a first substrate and a reflective electrode formed in a reflective area of the first substrate, thereby defining the transmissive area and the reflective area of the first substrate. The upper substrate includes a second substrate, a first insulating layer formed on the second substrate corresponding to the transmissive area, a common electrode formed on the first insulating layer and the second substrate corresponding to the reflective area, and a second insulating layer formed on the common electrode corresponding to the reflective area.

In still another aspect of the invention, a liquid crystal display apparatus includes a lower substrate, an upper substrate, a liquid crystal layer disposed between the lower substrate and the upper substrate, and an insulating layer.

The lower substrate includes a transmissive electrode and a reflective electrode having a transmission window through which the transmissive electrode is exposed so as to define a transmissive area and a reflective area. The upper substrate includes a color filter layer and a common electrode uniformly formed on the color filter layer in terms of thickness. The color filter layer has a first thickness at a position corresponding to the reflective area and a second thickness that is thicker than the first thickness at a position corresponding to the transmissive area. The insulating layer is disposed between the lower substrate and the upper substrate corresponding the reflective area.

In a method of manufacturing the upper substrate according to still another aspect of the invention, the first insulating layer is formed on a first area of a substrate including the first area and a second area adjacent to the first area. A transmissive electrode is formed on the first insulating layer and the second area of the substrate. Then, a second insulating layer is formed on the transmissive electrode corresponding to the second area.

In a method of manufacturing the liquid crystal display apparatus according to still another aspect of the invention, a liquid crystal display apparatus includes an upper substrate and a lower substrate. In order to form the upper substrate, a color filter layer is formed in a first area of a substrate including the first area and a second area adjacent to the first area, and a common electrode is formed on the color filter layer. In order to form the lower substrate, a transmissive electrode is formed on a second substrate and a reflective electrode is formed on the transmissive electrode corresponding to the first area.

Further, an insulating layer is formed between the upper substrate and the lower substrate corresponding to the first area, and a liquid crystal is disposed between the upper substrate and the lower substrate.

According to the liquid crystal display apparatus, the liquid crystal display apparatus may have a uniform cell gap and make a distance between the reflective electrode and the common electrode larger than a distance between the transmissive electrode and the common electrode. As a result, the liquid crystal display apparatus may enhance reflectance of the reflective area and transmittance of the transmissive area, thereby improving display quality thereof.

BRIEF DESCRIPTION OF THE DRAWINGS

The above and other advantages of the present invention will become readily apparent by reference to the following detailed description when considered in conjunction with the accompanying drawings wherein:

FIGS. 9A to 9C are views illustrating a method of manufacturing the upper substrate in FIG. 8.

DESCRIPTION OF THE PREFERRED EMBODIMENTS

Hereinafter, the present invention will be explained in detail with reference to the accompanying drawings.

Figure 1:
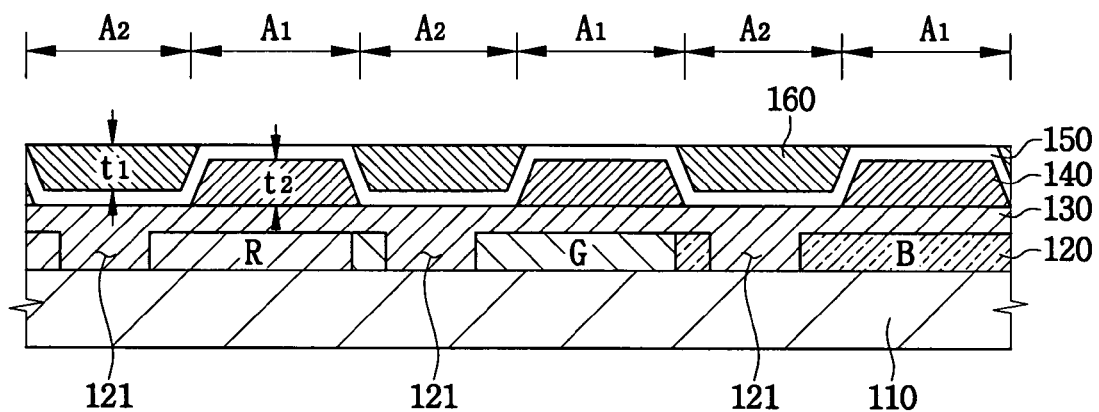
FIG. 1 is a cross-sectional view showing an upper substrate according to an exemplary embodiment of the present invention.
Figure 2:
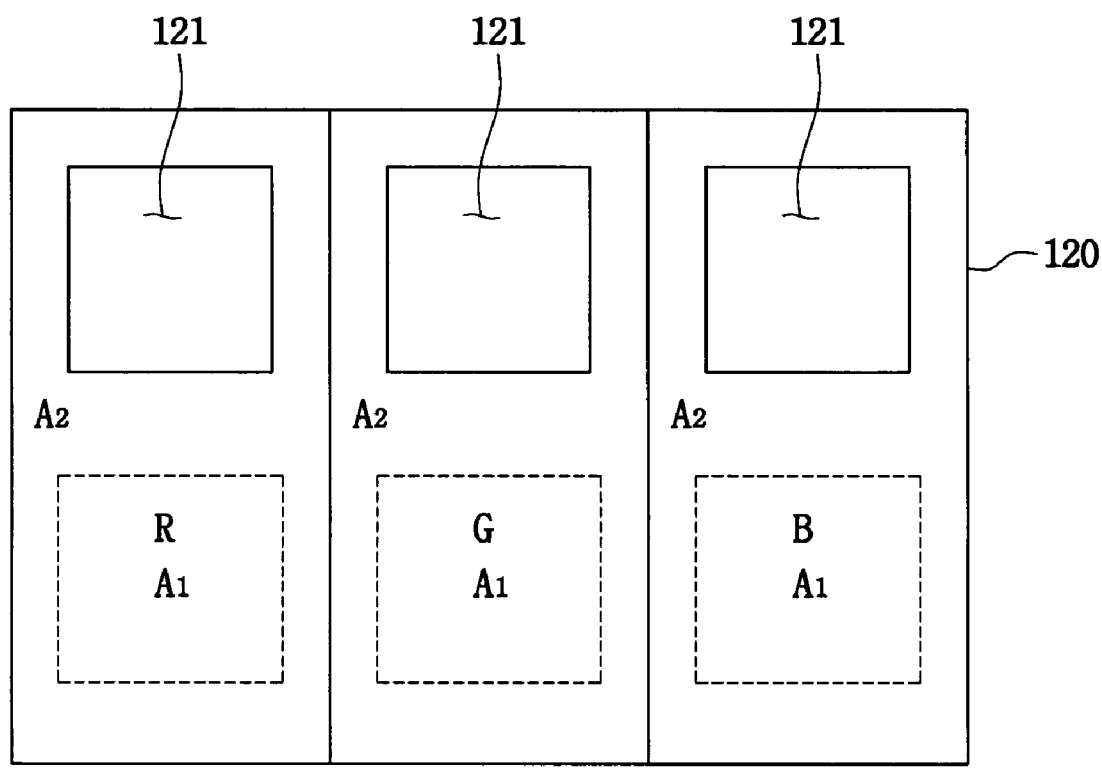
FIG. 2 is a plan view showing the upper substrate in FIG. 1.

FIG. 1 is a cross-sectional view showing an upper substrate according to an exemplary embodiment of the present invention. FIG. 2 is a plan view showing the upper substrate in FIG. 1.

Referring to FIGS. 1 and 2, the upper substrate 100 according to an exemplary embodiment of the present invention includes a color filter layer 120, a planarization layer 130, a first insulating layer 140, a common electrode 150 and a second insulating layer 160 successively formed on a substrate 110. The upper substrate 100 is divided into a first area A1 and a second area A2 adjacent to the first area A1. The first area A1 and the second area A2 are alternately formed in the upper substrate 100.

The color filter layer 120 includes red (R), green (G) and blue (B) color pixels, and the R, G and B color pixels have a hole 121 so as to partially expose the substrate 110 in the second area A2. The hole 121 has a width smaller than that of the second area A2. In FIG. 1, each of the R, G and B color pixels having one hole 121 has been shown, however, each of the R, G and B may have a plurality of holes formed therein.

The planarization layer 130 is formed on the color filter layer 120 and the substrate 110 exposed through the hole 121 so as to reduce a step-difference between the color filter layer 120 and the substrate 110 exposed through the hole 121.

Subsequently, the first insulating layer 140 is formed on the planarization layer 130 corresponding to the first area A1. The common electrode 150 is uniformly formed on the first insulating layer 140 and the planarization layer 130 corresponding to the second area A2.

The second insulating layer 160 is formed on the common electrode 150 corresponding to the second area A2. A first thickness t1 of the second insulating layer 160 is substantially identical to a second thickness t2 of the second insulating layer 160. Therefore, the upper substrate 100 may have a uniform thickness as a whole.

Figure 3:
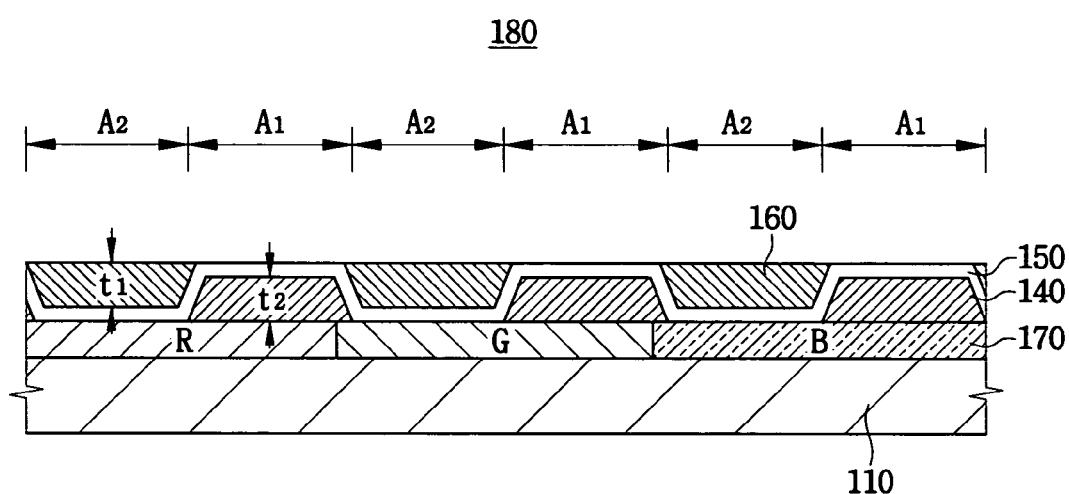
FIG. 3 is a cross-sectional view showing an upper substrate according to another exemplary embodiment of the present invention.

FIG. 3 is a cross-sectional view showing an upper substrate according to another exemplary embodiment of the present invention. In FIG. 3, the same reference numerals denote the same elements in FIG. 1, and thus any further detailed descriptions of the same elements will be omitted.

Referring to FIG. 3, an upper substrate 180 according to another exemplary embodiment of the present invention includes a color filter layer 170, a first insulating layer 140, a common electrode 150 and a second insulating layer 160 successively formed on a substrate 110. The upper substrate 180 is divided into a first area A1 and a second area A2 adjacent to the first area A1. The first area A1 and the second area A2 are alternately formed in the upper substrate 180.

The color filter layer 170 includes R, G and B color pixels. The first insulating layer 140 is formed on the color filter layer 170 corresponding to the first area A1. The common electrode 150 is uniformly formed on the first insulating layer 140 and the color filter layer 170 corresponding to the second area A2.

Then, the second insulating layer 160 is formed on the common electrode 150 corresponding to the second area A2. A first thickness t1 of the second insulating layer 160 is substantially identical to a second thickness t2 of the first insulating layer 140. Therefore, the upper substrate 180 may have a uniform thickness as a whole.

Figure 4:
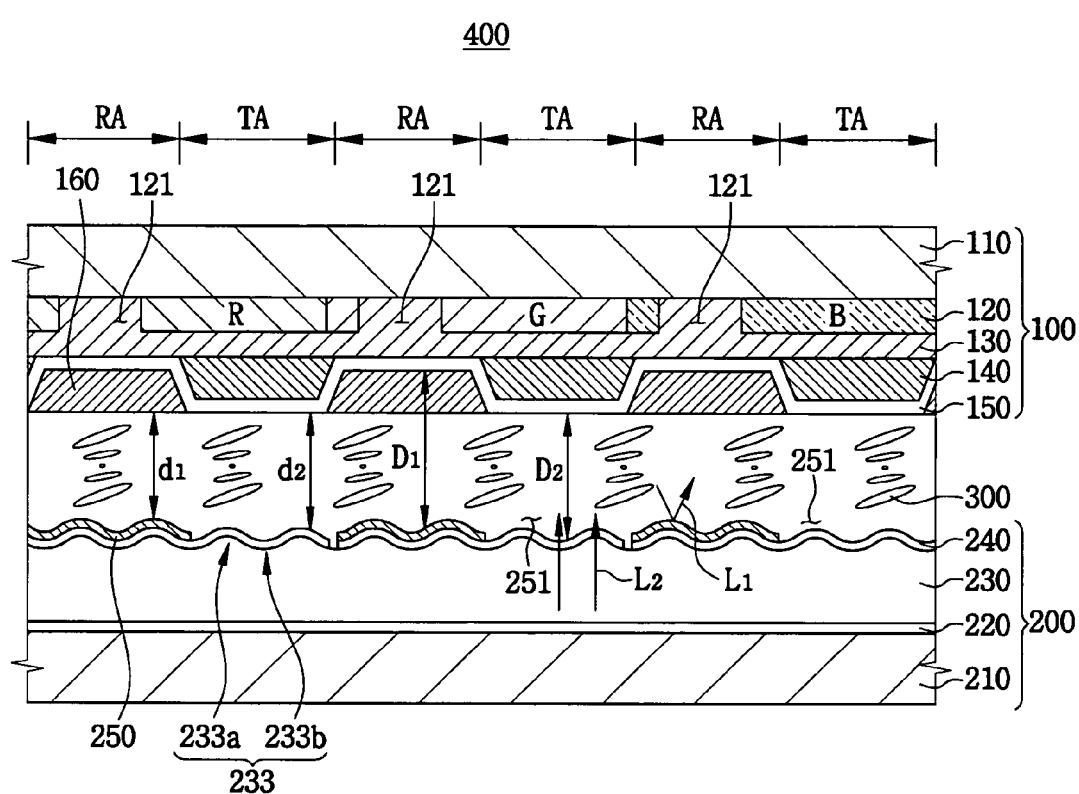
FIG. 4 is a cross-sectional view showing a transflective type liquid crystal display apparatus according to another exemplary embodiment of the present invention.

FIG. 4 is a cross-sectional view showing a transflective type liquid crystal display apparatus according to another exemplary embodiment of the present invention.

Referring to FIG. 4, a transflective type liquid crystal display apparatus 400 according to another exemplary embodiment of the present invention includes a lower substrate 200, an upper substrate 100 opposite to the lower substrate 200 and a liquid crystal layer 300 disposed between the lower substrate 200 and the upper substrate 100.

The lower substrate 200 includes a first substrate 210, a gate insulating layer 220, an organic insulating layer 230, a transmissive electrode 240 and a reflective electrode 250. A plurality of thin film transistors (TFTs) (not shown), and the gate insulating layer 220 are formed on the first substrate 210. The organic insulating layer 230 is formed on the TFTs and the gate insulating layer 220. In this exemplary embodiment, the organic insulating layer 230 comprises acrylic resin.

The organic insulating layer 230 has a plurality of concavo-convex portions 233 formed on an upper surface thereof. Each of the concavo-convex portions 233 includes a convex portion 233a and a concavo portion 233b. The convex portion 233a has a thickness thicker than that of the concavo portion 233b.

The transmissive electrode 240 including a transmissive conductive material, such as indium tin oxide (ITO) or indium zinc oxide (IZO) and so on, is uniformly formed on the organic insulating layer 230.

The reflective electrode 250 including a transmissive window 251 through which the transmissive electrode 240 is partially exposed is uniformly formed on the transmissive electrode 240. The reflective electrode 250 includes a single layer of aluminum neodymium (AlNd) or a double layer of aluminum neodymium (AlNd) and molybdenum tungsten (MoW).

Although not shown in FIG. 4, the organic insulating layer 230 may have a contact hole so as to expose a drain electrode of the TFT. In case that the contact hole is formed through the organic insulating layer 230, the transmissive electrode 240 and the reflective electrode 250 may be electrically connected to the drain electrode of the TFT through the contact hole.

Therefore, the transflective type liquid crystal display apparatus 400 has a reflective area RA in which the reflective electrode 250 is formed and a transmissive area TA in which the transmissive window 251 is formed. As shown in FIG. 4, the reflective area RA and the transmissive area TA may be alternately formed.

An external light L1 that is incident into the reflective area RA via the upper substrate 100 is reflected from the reflective electrode 250, and the reflected external light L1 is exited to outside the upper substrate 100, thereby displaying an image. An internal light L2 that is incident into the transmissive area TA from the light source part (not shown) disposed under the lower substrate 200 is exited via the transmission window 251, thereby displaying an image.

The upper substrate 100 includes a second substrate 110, a color filter layer 120, a planarization layer 130, a first insulating layer 140, a common electrode 150 and a second insulating layer 160 successively formed thereon.

The color filter layer 120 includes R, G and B color pixels, and each of the R, G and B color pixels has a hole 121 through which the second substrate 110 is exposed in the reflective area RA.

As described above, the external light L1 passes through the color filter layer 120 twice in the reflective area RA, and the internal light L2 passes through the color filter layer 120 once in the transmissive area TA.

In order to form the hole 121, the color filter layer 120 is partially removed in the reflective area RA. Accordingly, an amount of the external light L1 passing through the color filter layer 120 may be reduced, and thus a color reproducibility difference between the reflective area RA and the transmissive area TA may be minimized.

The planarization layer 130 is formed on the color filter layer 120 and the second substrate 110 exposed through the hole 121. The planarization layer 130 may reduce a step-difference between the color filter layer 120 and the second substrate 110 exposed through the hole 121.

The first insulating layer 140 is formed on the planarization layer 130 corresponding to the transmissive area TA.

The common electrode 150 is uniformly formed on the first insulating layer 140 and the planarization layer 130 corresponding to the reflective area RA.

The second insulating layer 160 is formed on the common electrode 150 corresponding to the reflective area RA. A first thickness t1 of the second insulating layer 160 is substantially identical to a second thickness t2 of the first insulating layer 140. Accordingly, the upper substrate 100 may have a uniform thickness as a whole (refer to FIG. 1).

Therefore, a first cell gap d1 at the reflective area RA and a second cell gap d2 at the transmissive area TA may be substantially identical to each other, so that the transflective type liquid crystal display apparatus 400 may have a uniform cell gap.

On the other hand, a first distance D1 between the reflective electrode 250 and the common electrode 150 at the reflective area RA is greater than a second distance D2 between the transmissive electrode 240 and the common electrode 150 at the transmissive area TA.

Figure 5:
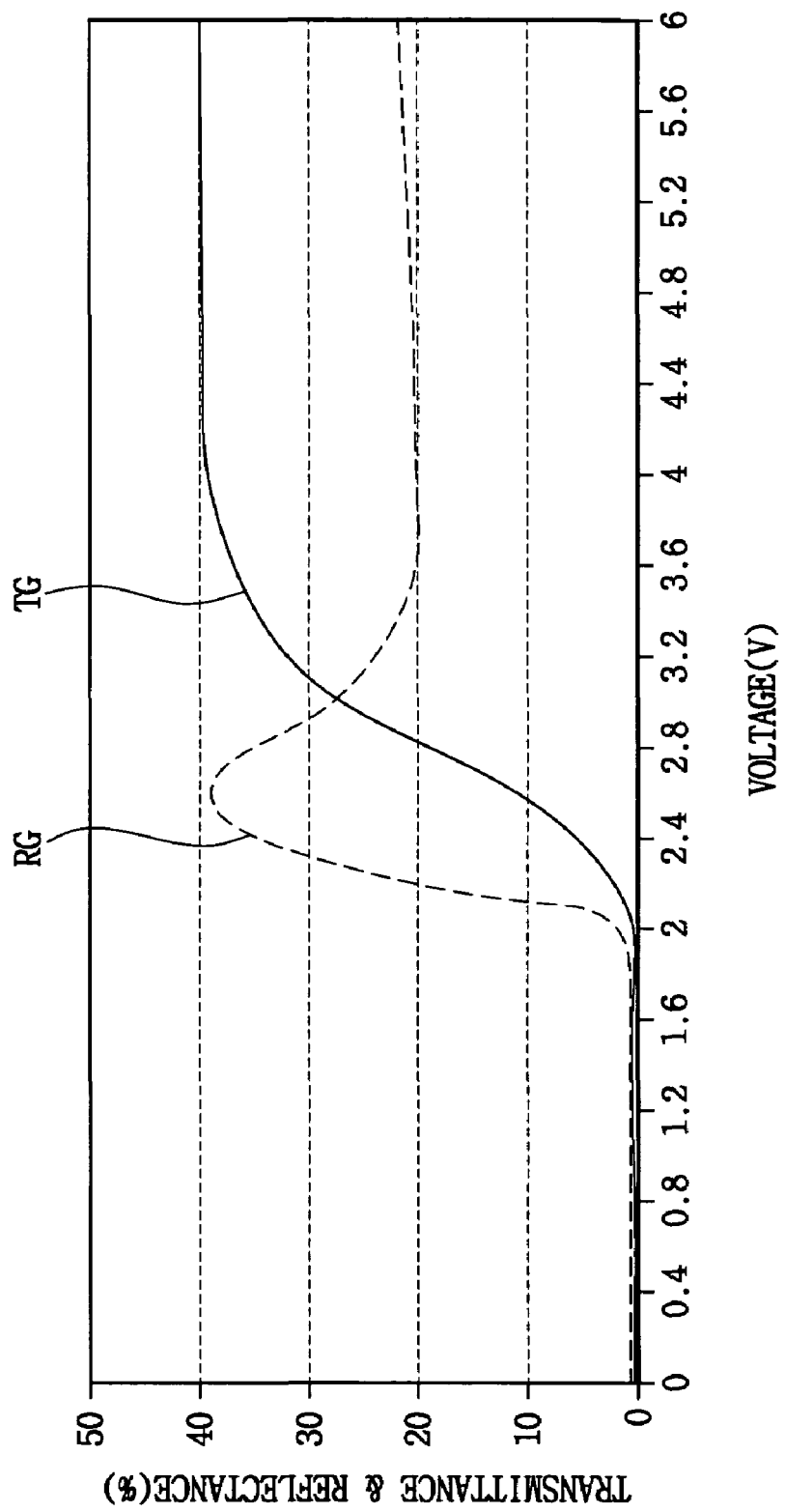
FIG. 5 is a graph showing transmittance and reflectance according to a voltage applied to the transmissive electrode and the reflective electrode.

FIG. 5 is a graph showing a transmittance and a reflectance according to voltage applied to the transmissive electrode and the reflective electrode, respectively. In FIG. 5, a first graph TG represents the transmittance, and a second graph RG represents the reflectance.

Referring to FIGS. 4 and 5, in case that a voltage applied to the common electrode 230 at the reflective area RA is substantially identical to that applied to the common electrode 230 at the transmissive area TA, the transflective type liquid crystal display apparatus 400 has a maximum transmittance of about 40% when the liquid crystal layer 300 disposed in the transmissive area TA receives a voltage of about 4.2 volts (V).

In case that a voltage applied to the common electrode 230 at the reflective area RA is substantially identical to that applied to the common electrode 230 at the transmissive area TA, the transflective type liquid crystal display apparatus 400 has a maximum reflectance of about 38% when the liquid crystal layer 300 disposed in the reflective area RA receives a voltage of about 2.6V.

Since a transmissive voltage of the maximum transmittance and a reflective voltage of the maximum reflectance are different from each other, the liquid crystal layer 300 disposed in the reflective area RA receives a voltage different from a voltage applied to the liquid crystal layer 300 disposed in the transmissive area TA. That is, the voltage of about 4.2V is applied to the liquid crystal layer 300 disposed in the transmissive area TA, and the voltage of about 2.6V is applied to the liquid crystal layer 300 disposed in the reflective area RA. Thus, the transflective type liquid crystal display apparatus 400 may have the maximum transmittance and the maximum reflectance.

In general, a capacitance C is represented by the following Equation 1.

$$C = \in A/d \hspace{4em} \text{Equation 1}$$

In Equation 1, '$\in$' indicates a dielectric constant, 'd' represents a distance between two electrodes and 'A' indicates a square of each of the two electrodes.

As represented by the Equation 1, the capacitance C is inversely proportional to the distance d. When the distance d increases, the capacitance C decreases, and vice versa.

Also, the capacitance C may be represented by the following Equation 2.

$$C = Q/V \hspace{4em} \text{Equation 2}$$

In Equation 2, 'Q' and 'V' represent a quantity of electric charge and a voltage, respectively.

As represented by Equation 2, the capacitance C is inversely proportional to the voltage V. When the capacitance C increases, the voltage V decreases, and vice versa.

Referring to the FIG. 4, a first distance D1 between the reflective electrode 250 and the common electrode 150 at the reflective area RA is greater than a second distance D2 between the transmissive electrode 240 and the common electrode 150 at the transmissive area TA.

According to Equations 1 and 2, when the first distance D1 at the reflective area RA is greater than the second distance D2 at the transmissive area TA, the reflective voltage applied to the liquid crystal layer 300 corresponding to the reflective area RA is smaller than the transmissive voltage applied to the liquid crystal layer 300 corresponding to the transmissive area TA.

As represented by Equation 1, the dielectric constant $\in$ acts as a factor that affects value of the capacitance C. A dielectric constant of the second insulating layer 160 that is disposed between the reflective electrode 250 and the common electrode 150 may be changed, so that the reflective voltage may be lowered more than the transmissive voltage. That is, since the second insulating layer 160 has a dielectric constant different from that of the liquid crystal layer 300, a reflective voltage level may be changed.

In the transflective type liquid crystal display apparatus 400 having a uniform cell gap at the reflective area RA and the transmissive area TA, a voltage different from a voltage applied to the transmissive area TA may be applied to the reflective area RA. Particularly, the liquid crystal layer 300 that is disposed in the reflective area RA receives the voltage of about 2.6V, and the liquid crystal layer 300 that is disposed in the transmissive area TA receives the voltage of about 4.2V. Thus, the transflective type liquid crystal display apparatus 400 may have the maximum reflectance with respect to the external light L1 and the maximum transmittance with respect to the internal light L2.

FIGS. 6A to 6E are views illustrating a method of manufacturing the upper substrate in FIG. 1 according to an exemplary embodiment of the present invention.

Figure 6A:
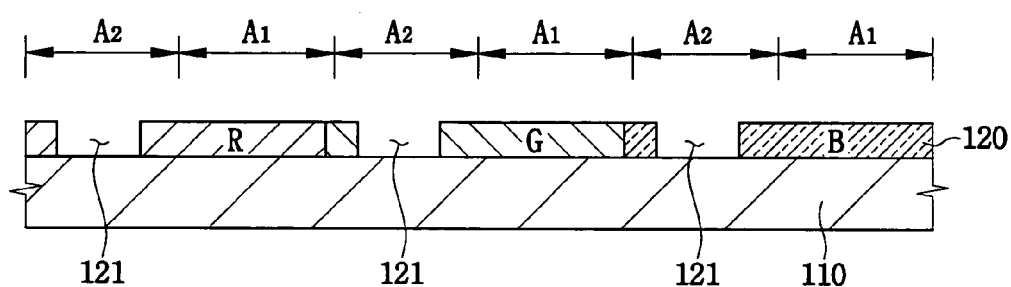
FIGS. 6A to 6E are views illustrating a method of manufacturing the upper substrate in FIG. 1 according to an exemplary embodiment of the present invention.

Referring to FIG. 6A, a color filter layer 120 including R, G and B color pixels is formed on a substrate 110. Each of the R, G and B color pixels has a hole 121 so as to expose the substrate 110 corresponding to a second area A2. In order to partially expose the substrate 110, each of the R, G and B color pixels formed in the second area A2 is partially removed.

Figure 6B:
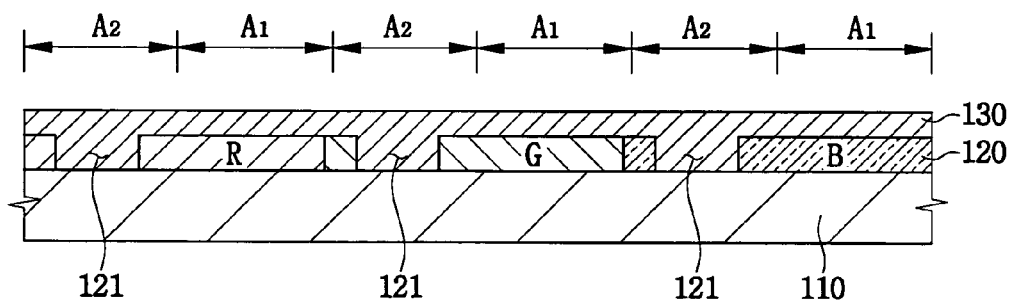

As shown in FIG. 6B, a planarization layer 130 is formed on the color filter layer 120 and the substrate 110 exposed through the hole 121. The planarization layer 130 reduces a step-difference between the color filter layer 120 and the substrate 110 exposed through the hole 121.

Figure 6C:
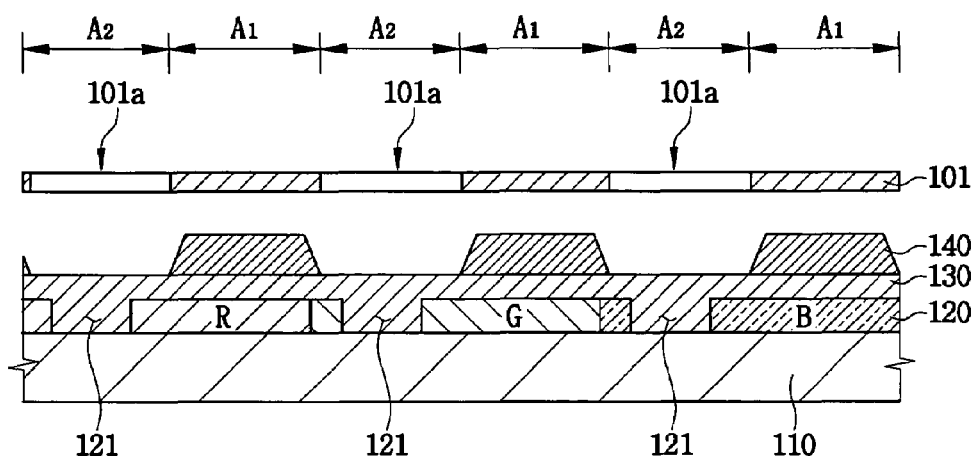

Referring to FIG. 6C, when a positive type photoresist (not shown) is formed over the planarization layer 130, a first mask 101 disposed on the positive type photoresist so as to pattern the positive type photoresist. The first mask 101 has an opening 101a corresponding to the second area A2.

Further, the positive type photoresist on which the first mask 101 is disposed is exposed. After removing the first mask 101, the positive type photoresist is developed to partially remove the positive type photoresist. As a result, a first insulating layer 140 is formed on the planarization layer 130 corresponding to a first area A1.

Figure 6D:
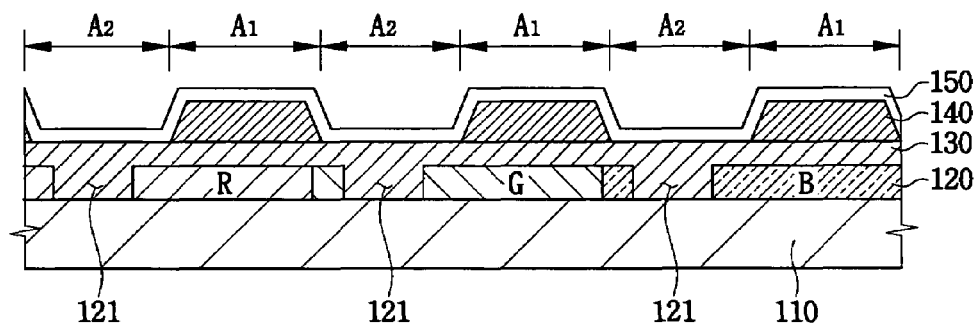

As shown in FIG. 6D, a common electrode 150 is uniformly formed on the first insulating layer 140 and the planarization layer 130 exposed through the second area A2.

In this exemplary embodiment, the common electrode 150 includes indium tin oxide (ITO) and indium zinc oxide (IZO).

Figure 6E:
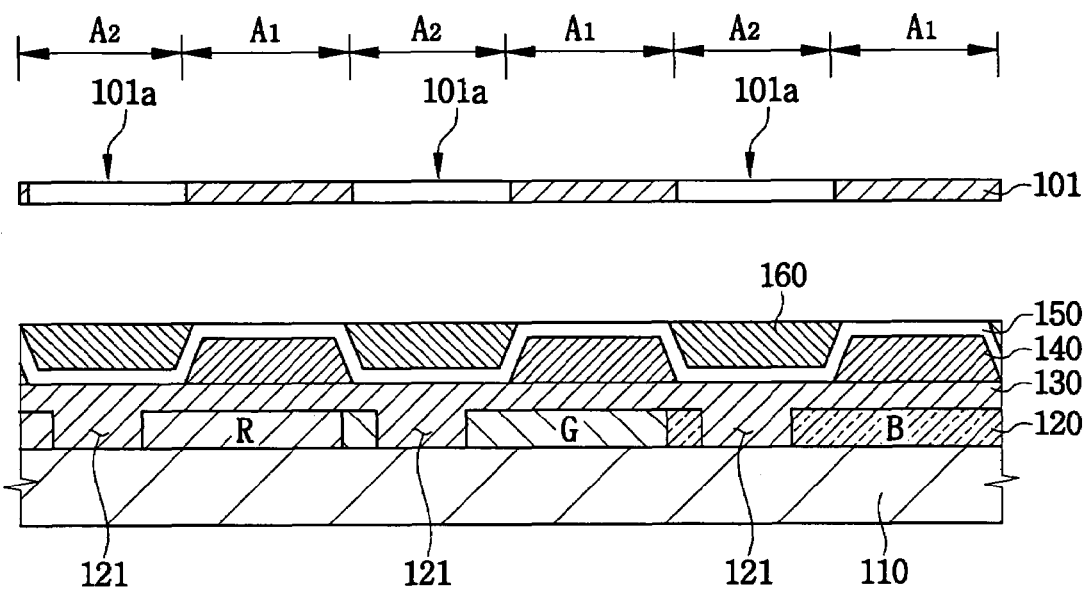

Referring to FIG. 6E, a negative type photoresist (not shown) is formed over the common electrode 150, and the first mask 101 is formed on the negative type photoresist so as to pattern the negative type photoresist.

Next, the negative type photoresist on which the first mask 101 is disposed is exposed. After removing the first mask 101, the negative type photoresist is developed to partially remove the negative type photoresist. As a result, the second insulating layer 160 is formed on the common electrode 150 corresponding to the second area A2.

Thus, since the first insulating layer 140 includes the positive type photoresist and the second insulating layer 160 includes the negative type photoresist, the first and second insulating layers 140 and 160 may be patterned using the first mask 101. Therefore, manufacturing processes of an upper substrate 100 may be reduced, thereby lowering manufacturing cost of the upper substrate 100.

Figure 7A:
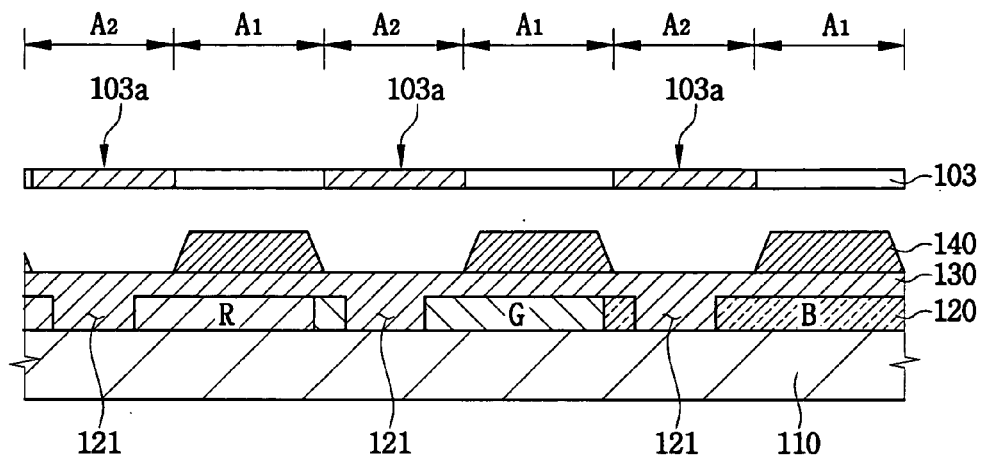
FIGS. 7A to 7C are views illustrating a method of manufacturing the upper substrate in FIG. 1 according to another exemplary embodiment of the present invention.
Figure 7B:
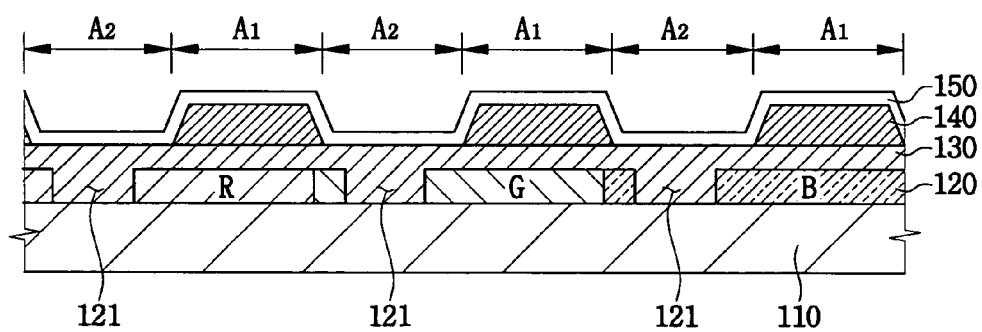
Figure 7C:
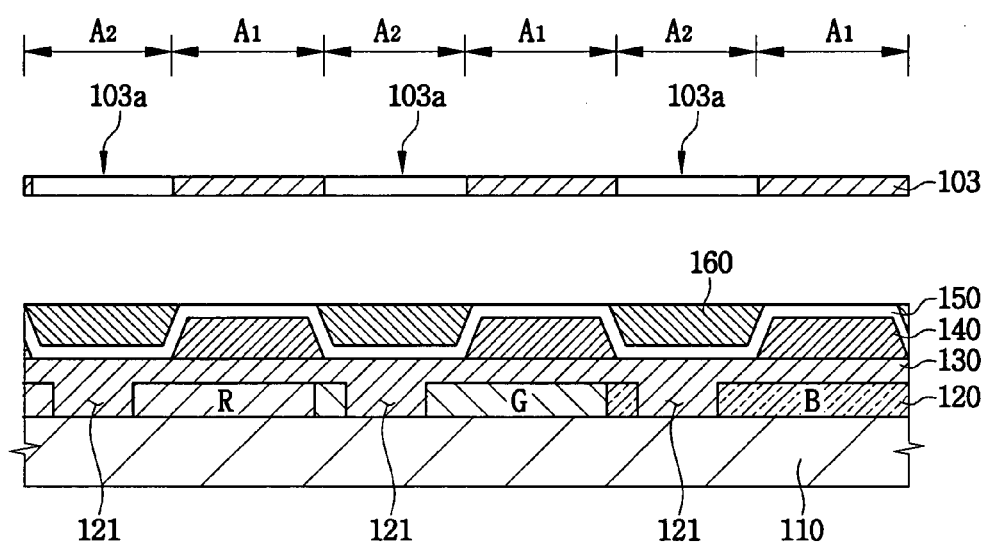

FIGS. 7A to 7C are views illustrating a method of manufacturing the upper substrate in FIG. 1 according to another exemplary embodiment.

Referring to FIG. 7A, a color filter layer 120 and a planarization layer 130 are formed on a substrate 100, and a negative type photoresist (not shown) is formed over the planarization layer 130. Then, in order to pattern the negative type photoresist, a second mask 103 is disposed on the negative type photoresist. In this exemplary embodiment, the second mask 103 has an opening 103a corresponding to a first area A1.

The negative type photoresist is exposed using the second mask 103. After removing the second mask 103, the negative type photoresist is developed to remove the negative type photoresist. As a result, a first insulating layer 140 is formed on the planarization layer 130 corresponding to the first area A1.

As shown in FIG. 7B, a common electrode 150 is uniformly formed on the first insulating layer 140 and the planarization layer 130 corresponding to a second area A2.

Referring to FIG. 7C, a positive type photoresist (not shown) is disposed over the common electrode 150. In order to pattern the positive type photoresist, the second mask 103 is disposed on the positive type photoresist.

The positive type photoresist is then exposed using the second mask 103. After removing the second mask 103, the positive type photoresist is developed to partially remove the positive type photoresist. As a result, a second insulating layer 160 is formed on the common electrode 150 corresponding to the second area A2.

Thus, since the first insulating layer 140 includes the negative type photoresist and the second insulating layer 160 includes the positive type photoresist, the first and second insulating layers 140 and 160 may be patterned using the second mask 103. Thus, manufacturing processes of an upper substrate 100 may be reduced, thereby lowering manufacturing cost of the upper substrate 100.

Although not shown in the figures in this exemplary embodiment, the first and second insulating layers 140 and 160 may include the positive type photoresist. Additionally, the first and second insulating layers 140 and 160 may include the negative type photoresist. In this case, an additional mask is needed to pattern the second insulating layer.

Figure 8:
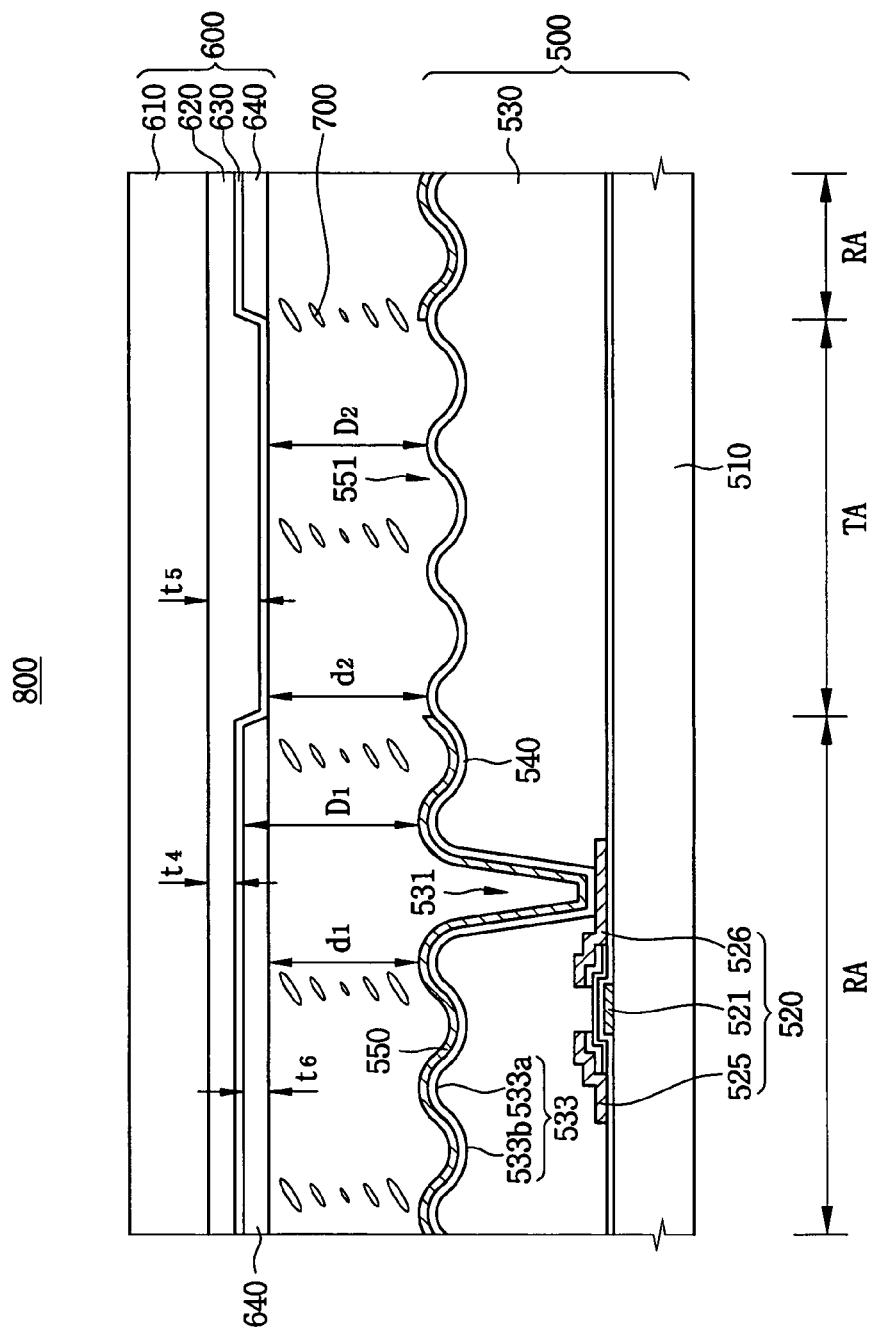
FIG. 8 is a cross-sectional view a transflective type liquid crystal display apparatus according to another exemplary embodiment of the present invention.

FIG. 8 is a cross-sectional view showing a transflective type liquid crystal display apparatus according to another exemplary embodiment of the present invention.

Referring to FIG. 8, a transflective type liquid crystal display apparatus 800 includes a lower substrate 500, an upper substrate 600 opposite to the lower substrate 500 and a liquid crystal layer 700 disposed between the lower substrate 500 and the upper substrate 600.

The lower substrate 500 includes a first substrate 510, a plurality of TFTs 520 formed on the first substrate 510, a transmissive electrode 540 and a reflective electrode 550. Each of the TFTs 520 formed on the first substrate 510 includes a gate electrode 521, a source electrode 525 and a drain electrode 526. An organic insulating layer 530 is formed over the TFTs 520. The organic insulating layer 530 has a contact hole 531 so as to expose the drain electrode 526. In this exemplary embodiment, the organic insulating layer 530 has a plurality of concavo-convex portions 533 formed on an upper surface thereof, and each of the concavo-convex portions 533 includes a convex portion 533a and a concavo portion 533b.

The transmissive electrode 540 is uniformly formed on the organic insulating layer 530, and electrically connected to the drain electrode 526 via the contact hole 531. The reflective electrode 550 having a transmission window 551 through which the transmissive electrode 540 is partially exposed is uniformly formed on the transmissive electrode 540.

Therefore, the transflective type liquid crystal display apparatus 800 includes a reflective area RA in which the reflective electrode 550 is formed and the transmissive area TA in which the transmission window 551 is formed.

The upper substrate 600 includes a second substrate 610, a color filter layer 620 formed on the second substrate 610, a common electrode 630 and an insulating layer 640. The color filter layer 620 including R, G and B color pixels has a fourth thickness t4 at a position corresponding to the reflective area RA and has a fifth thickness t5, which is thicker than the fourth thickness t4, at a position corresponding to the transmissive area TA. In this exemplary embodiment, the fifth thickness t5 is thicker than the fourth thickness t4 by a thickness of about 0.6 μm. The transflective type liquid crystal display apparatus 800 has a step-different of about 0.6 μm between the color filter layer 620 formed in the reflective area RA and the color filter layer 620 formed in the transmissive area TA.

The common electrode 630 having a uniform thickness and the insulating layer 640 are successively formed on the color filter layer 620. Especially, the insulating layer 640 is formed only in the reflective area RA. The insulating layer 640 has a sixth thickness t6 of about 0.6 μm that is substantially identical to the step-different of the color filter layer 620 between the reflective area RA and the transmissive area TA.

Thus, the first cell gap d1 at the reflective area RA and the second cell gap d2 at the transmissive area TA are substantially identical to each other, so that the transflective type liquid crystal display apparatus 800 may have a uniform cell gap.

The first distance D1 between the common electrode 630 and the reflective electrode 550 at the reflective area RA is greater than the second distance D2 between the common electrode 630 and the transmissive electrode 540 at the transmissive area TA. The reflective voltage applied to the liquid crystal layer 700 corresponding to the reflective area RA is smaller than the transmissive voltage applied to the liquid crystal layer 700 corresponding to the transmissive area TA.

In addition, when a dielectric constant of the insulating layer 640 disposed between the reflective electrode 550 and the common electrode 630 is changed, the reflective voltage may be lowered more than the transmissive voltage. That is, a level of the reflective voltage may be changed because the insulating layer 640 has a dielectric constant different from that of the liquid crystal layer 700.

Figure 9A:
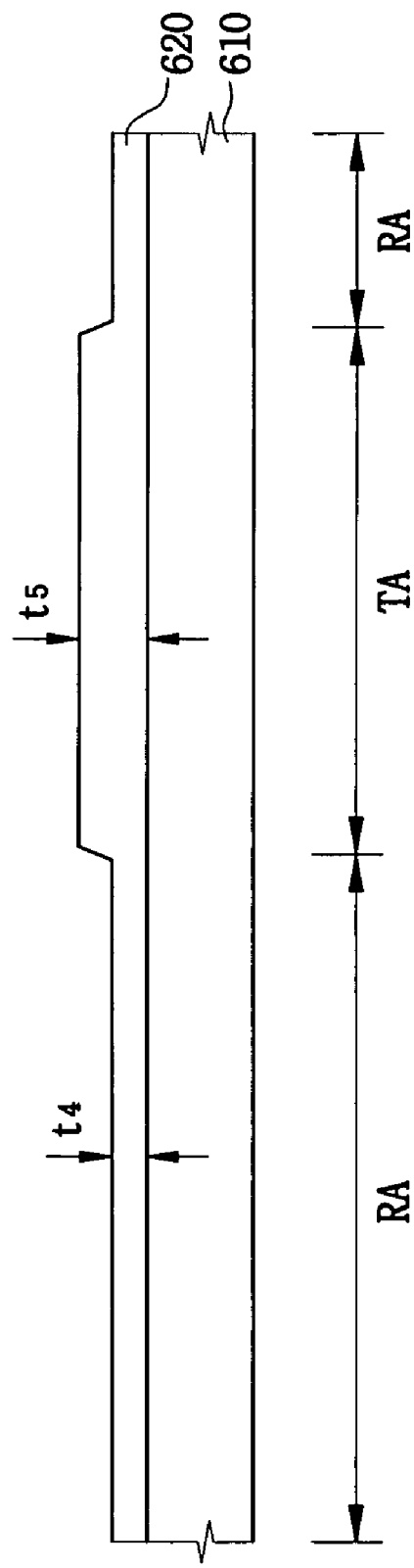
Figure 9B:
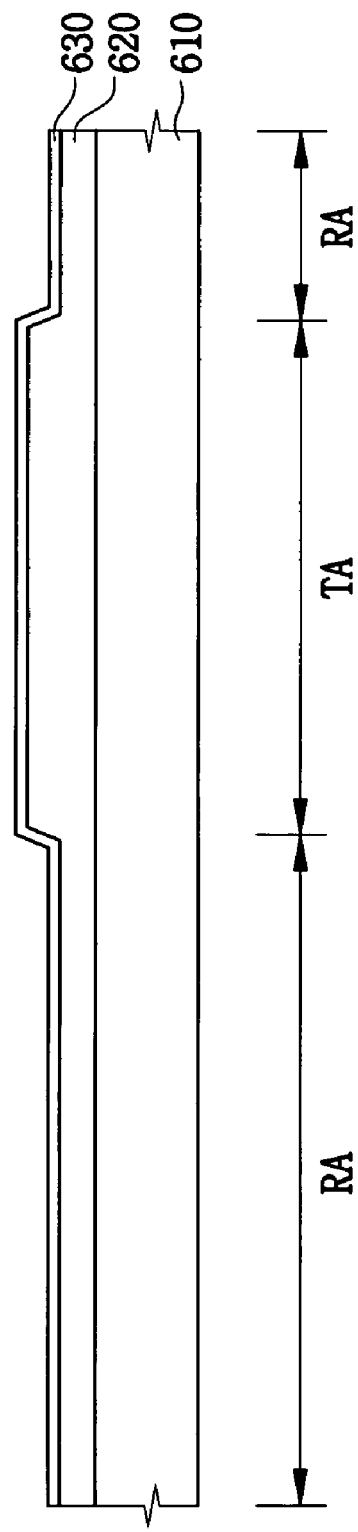

FIGS. 9A to 9C are views illustrating a method of manufacturing the transflective type liquid crystal display apparatus shown in FIG. 8.

Referring to FIG. 9A, the color filter layer 620 having the R, G and B color pixels is formed on the second substrate 610. The color filter layer 620 has the fourth thickness t4 at a position corresponding to the reflective area RA and the fifth thickness t5 at a position corresponding to the transmissive area TA. The fifth thickness t5 is thicker than the fourth thickness t4.

As shown in FIG. 9B, the common electrode 630 is uniformly formed on the color filter layer 620.

Referring to FIG. 9C, the insulating layer 640 is formed on the common electrode 630. In particular, the insulating layer 640 is formed in the reflective area RA. The sixth thickness t6 of the insulating layer 640 is substantially identical to the step-different between the color filter layer 620 formed in the reflective area RA and the color filter layer 620 formed in the transmissive area TA. Thus, the color filter substrate 600 may have a flat surface.

Figure 10:
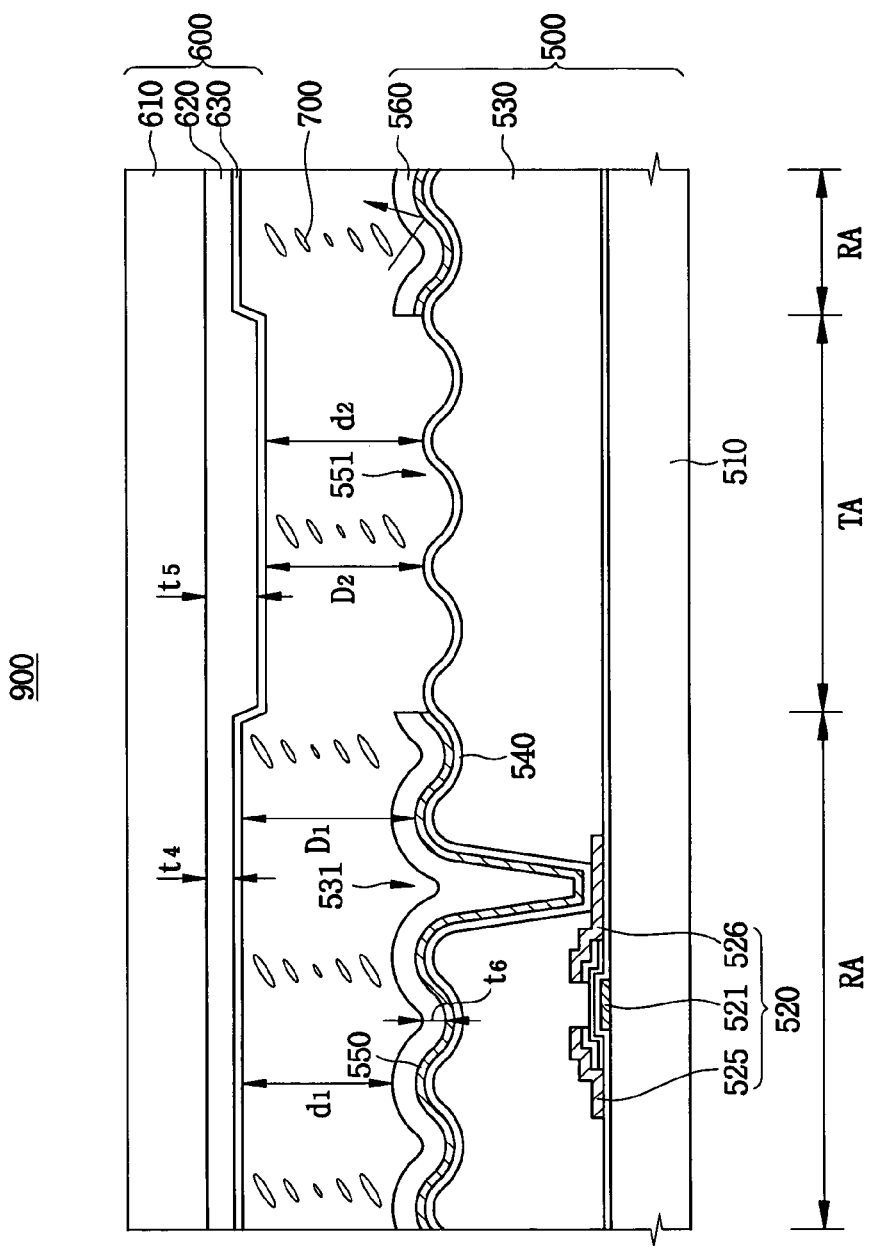
FIG. 10 is a cross-sectional view showing a transflective type liquid crystal display apparatus according to another exemplary embodiment of the present invention.

FIG. 10 is a cross-sectional view showing a transflective type liquid crystal display apparatus according to another exemplary embodiment of the present invention. In FIG. 10, the same reference numerals denote the same elements in FIG. 8, and thus the detailed descriptions of the same elements will be omitted.

Referring to FIG. 10, a transflective type liquid crystal display apparatus 900 according to another exemplary embodiment of the present invention includes a lower substrate 500, an upper substrate 600 and a liquid crystal layer 700 disposed between the lower substrate 500 and the upper substrate 600.

The lower substrate 500 includes a first substrate 510, a TFT 520 formed on the first substrate 510, an organic insulating layer 530, a transmissive electrode 540 and a reflective electrode 550 and an insulating layer 560.

The TFT 520 formed on the first substrate 510 includes a gate electrode 521, a source electrode 522 and a drain electrode 523. The organic insulating layer 530 having a contact hole 531 is formed on the first substrate 510 and the TFT 520 so as to expose the drain electrode 523.

Then, the transmissive electrode 540 that is electrically connected to the drain electrode 523 through the contact hole 531 is uniformly formed on the organic insulating layer 530. The reflective electrode 550 through which a transmission window 551 is formed is uniformly formed on the transmissive electrode 540 so as to partially expose the transmissive electrode 540. The insulating layer 560 is formed on the reflective electrode 550 corresponding to a reflective area RA.

The upper substrate 600 includes a second substrate 610, a color filter layer 620 and a common electrode 630. The color filter layer 620 that includes R, G and B color pixels is formed on the second substrate 610. The color filter layer 620 has a fourth thickness t4 at a position corresponding to the reflective area RA and a fifth thickness t5, which is thicker than the fourth thickness t4, at a position corresponding to a transmissive area TA. Then, the common electrode 630 is uniformly formed on the color filter layer 620.

The insulating layer 560 formed on the lower substrate 500 has a sixth thickness t6 substantially identical to a thickness subtracting the fourth thickness t4 from the fifth thickness t5. Therefore, a first cell gap d1 at the reflective area RA may be substantially identical to a second cell gap d2 at the transmissive area TA, so that the transflective liquid crystal display apparatus 900 may have a uniform cell gap.

Although the transflective liquid crystal display apparatus 900 has a uniform cell gap, the first distance D1 between the reflective electrode 550 and the common electrode 630 at the reflective area RA is greater than a second distance D2 between the transmissive electrode 540 and the common electrode 630 at the transmissive area TA. Thus, the reflective voltage applied to the liquid crystal layer 700 corresponding to the reflective area RA is smaller than the transmissive voltage applied to the liquid crystal layer 700 corresponding to the transmissive area TA.

Also, if a dielectric constant of the insulating layer 640 disposed between the reflective electrode 550 and the common electrode 630 is different from that of the liquid crystal layer 700, the reflective voltage may be lowered than the transmissive voltage.

According to the liquid crystal display apparatus having the upper substrate and the method of manufacturing the upper substrate, the upper substrate includes the first insulating layer formed on the substrate corresponding to the transmissive area, the common electrode formed on the first insulating layer and on the substrate corresponding to the reflective area, and the second insulating layer formed on the common electrode corresponding to the reflective area.

Therefore, the liquid crystal display apparatus may have a uniform cell gap, and simultaneously maintain the first distance between the reflective electrode and the common electrode being greater than the second distance between the transmissive electrode and the common electrode, thereby enhancing the reflectance of the reflective area and the transmittance of the transmissive area and improving display quality of the liquid crystal display apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An upper substrate comprising:
   a substrate having a first area and a second area adjacent to the first area;
   a first insulating layer disposed on the first area of the substrate;
   a transparent electrode disposed on the first insulating layer and the second area of the substrate, the transparent electrode having a first portion corresponding to the first area and a second portion corresponding to the second area, the first and second portions forming a step so that the first portion is more distant from the substrate than the second portion;
   a color filter layer disposed between the substrate and the first insulating layer at the first area, and disposed between the substrate and the transparent electrode at the second area; and
   a second insulating layer disposed on the transparent electrode corresponding to the second area,
   wherein the upper substrate is formed to pass light traversing the substrate through both the first and second areas.

2. The upper substrate of claim 1, wherein the color filter layer has at least one hole though which the second area of the substrate is exposed.

3. The upper substrate of claim 2, further comprising a planarization layer formed on the color filter layer so as to reduce a step-difference between the color filter layer and the substrate exposed through the hole.

4. A liquid crystal display apparatus comprising:
   a lower substrate having a transmissive electrode formed in a transmissive area of a first substrate and a reflective electrode formed in a reflective area of the first substrate so as to define the transmissive area and the reflective area of the first substrate;
   an upper substrate having a second substrate, a first insulating layer formed on the second substrate corresponding to the transmissive area, a common electrode formed on the first insulating layer and the second substrate corresponding to the reflective area, and a second insulating layer formed on the common electrode corresponding to the reflective area; and
   a liquid crystal layer disposed between the lower substrate and the upper substrate.

5. The liquid crystal display apparatus of claim 4, wherein the reflective electrode is formed on the transmissive electrode, and the reflective electrode has a transmission window through which the transmissive electrode is partially exposed.

6. The liquid crystal display apparatus of claim 5, wherein the lower substrate further comprises an organic insulating layer disposed between the first substrate and the transmissive electrode, and the organic insulating layer has at least one concavo-convex portion formed on an upper surface thereof.

7. The liquid crystal display apparatus of claim 4, wherein the second insulating layer has a dielectric constant different from a dielectric constant of the liquid crystal layer.

8. A liquid crystal display apparatus comprising:
   a lower substrate having a transmissive electrode and a reflective electrode having a transmission window through which the transmissive electrode is exposed so as to define a transmissive area and a reflective area;
   an upper substrate combined with the lower substrate, the upper substrate having a color filter layer and a common electrode uniformly formed on the color filter layer in thickness, the color filter layer having a first thickness at a position corresponding to the reflective area and a second thickness that is thicker than the first thickness at a position corresponding to the transmissive area;
   a liquid crystal layer disposed between the lower substrate and the upper substrate; and
   an insulating layer disposed on the common electrode and disposed between the lower substrate and the common electrode of the upper substrate corresponding to the reflective area.

9. The liquid crystal display apparatus of claim 8, wherein the insulating layer comprises an inorganic insulating layer or an organic insulating layer.

10. The liquid crystal display apparatus of claim 8, wherein the insulating layer has a dielectric constant different from a dielectric constant of the liquid crystal layer.

11. The liquid crystal display apparatus of claim 8, wherein the insulating thin layer has a thickness subtracting the first thickness from the second thickness.

12. The liquid crystal display apparatus of claim 8, wherein the lower substrate further comprises:
   a thin film transistor; and
   an organic insulating layer formed on the thin film transistor and having a contact hole so as to expose a drain electrode of the thin film transistor,
   wherein the transmissive electrode and the reflective electrode are electrically connected to the drain electrode via the contact hole.

* * * * *